(12) United States Patent
Lalos et al.

(10) Patent No.: US 11,009,197 B2
(45) Date of Patent: May 18, 2021

(54) STREET LIGHT FITTED WITH A SMART WIRELESS COMMUNICATION NODE

(71) Applicants: Dimitrios Lalos, Elmhurst, IL (US); Alexander Lalos, Elmhurst, IL (US)

(72) Inventors: Dimitrios Lalos, Elmhurst, IL (US); Alexander Lalos, Elmhurst, IL (US)

( * ) Notice: Subject to any disclaimer, the term of this patent is extended or adjusted under 35 U.S.C. 154(b) by 0 days.

(21) Appl. No.: 16/126,192

(22) Filed: Sep. 10, 2018

(65) Prior Publication Data
US 2020/0080695 A1 Mar. 12, 2020

Related U.S. Application Data

(60) Provisional application No. 62/558,443, filed on Sep. 14, 2017.

(51) Int. Cl.
| | | |
|---|---|---|
| *F21S 8/08* | (2006.01) | |
| *F21K 9/238* | (2016.01) | |
| *G08C 17/02* | (2006.01) | |
| *F21V 33/00* | (2006.01) | |
| *H04W 4/02* | (2018.01) | |
| *F21W 131/103* | (2006.01) | |
| *F21Y 115/10* | (2016.01) | |
| *F21V 23/00* | (2015.01) | |

(52) U.S. Cl.
CPC ............... *F21S 8/086* (2013.01); *F21K 9/238* (2016.08); *F21V 33/0052* (2013.01); *G08C 17/02* (2013.01); *F21V 23/009* (2013.01); *F21W 2131/103* (2013.01); *F21Y 2115/10* (2016.08); *H04W 4/025* (2013.01)

(58) Field of Classification Search
CPC .... F21S 8/086; F21S 8/08; F21S 8/085; F21S 8/088; F21W 2131/103; F21W 2131/10; F21Y 2115/10; F21V 23/002; F21V 23/009; F21V 15/01; F21V 21/14; F21V 21/10; F21V 21/116
See application file for complete search history.

(56) References Cited

U.S. PATENT DOCUMENTS

| | | | | |
|---|---|---|---|---|
| 5,282,118 A | * | 1/1994 | Lee | F21S 8/033 362/276 |
| 5,434,764 A | * | 7/1995 | Lee | F21S 8/033 250/239 |
| 9,286,815 B1 | * | 3/2016 | Smith | G09F 19/12 |

(Continued)

*Primary Examiner* — Isiaka O Akanbi
*Assistant Examiner* — Fatima N Farokhrooz
(74) *Attorney, Agent, or Firm* — Taft Stettinious & Hollister LLP; Daniel A. Rosenberg

(57) ABSTRACT

The present invention relates to a smart communications node networked and adapted for use with existing, or new, street lights. In particular, the present invention generally relates to a mobile communications network and, in particular one utilizing small cell technology mounted onto street/utility poles through which a cellular signal and/or Wi-Fi communications signals may be seamlessly maintained for voice or data exchanges, coupled with smart city computer applications utilizing the small cell technology or any other wireless or wireline connection and allowing for seamless communications to a variety of destination point (Internet access, cellular phone calls, surveillance, city monitoring center, smart vehicle guidance systems, sensors or various kinds, etc.) via a managed switch at the smart network's location.

20 Claims, 17 Drawing Sheets

Tenon mount and extension

(56) References Cited

U.S. PATENT DOCUMENTS

| | | | |
|---|---|---|---|
| 2012/0228529 A1* | 9/2012 | Trewin | F21V 23/02 250/551 |
| 2013/0044488 A1* | 2/2013 | Hreish | F21V 33/00 362/253 |
| 2015/0021990 A1* | 1/2015 | Myer | F21S 2/00 307/23 |
| 2016/0240114 A1* | 8/2016 | Rauma | G09F 15/0081 |
| 2018/0045388 A1* | 2/2018 | McDowell | F21V 29/15 |
| 2018/0172243 A1* | 6/2018 | Clynne | F21S 8/08 |
| 2018/0283629 A1* | 10/2018 | Fisher | F21V 21/116 |
| 2018/0305876 A1* | 10/2018 | Langford | G08G 1/0145 |
| 2018/0363894 A1* | 12/2018 | Gabriel | G08B 13/19632 |
| 2019/0350065 A1* | 11/2019 | Stuby, Jr. | H05B 47/115 |

\* cited by examiner

Figure 1. LED light

Figure 2. Proposed installation of LED light with smart node

Figure 3. Bottom view of the modified LED light with the smart node

Figure 4. Small cell custom size cut out

Figure 5. Top view of the modified LED Light with the smart node and small cell

Figure 6. Tenon mount and extension

Figure 7. connecting the light with the Tenon extension

Figure 9. Integrated Smart Node with LED light

Figure 10. Smart Power Distribution with no light sensor

Figure 11. Smart node block diagram

Figure 12. Smart node Routing

US 11,009,197 B2

STREET LIGHT FITTED WITH A SMART WIRELESS COMMUNICATION NODE

RELATED APPLICATIONS

The present application claims priority to and incorporates by reference U.S. Provisional Patent Application No. 62/558,443, filed on Sep. 14, 2017.

BACKGROUND OF THE INVENTION

Field of the Invention

The present invention relates to a multifunction smart communications node for use with a streetlight.

Background

A street light is an elevated light source located next to a road, walkway, or other open location. In the most basic form, shown in FIG. 1, a street light comprises a pole extending upward from the ground 100, an extension arm or tenon 101, where one end extends generally horizontally outward from the upper end of the pole, and a street light fixture 200 connected to the opposite end of the tenon which houses the lamp.

Street lights are connected to an underground power source, and are activated to provide illumination during nighttime or in some cases during the day when cloud cover causes unusually dark conditions. Typically, modern street lights have light-sensitive photocells that activate the light automatically when light illumination is or is not needed. Older systems use timers to activate the lights based on the time of day.

Currently, there is a trend to replace older aging street light technologies with more modern efficient and multifunction versions. In particular, cities across the country are replacing older street light bulbs with newer light sources such as LED lights. This typically involves removing the old analog light and inserting a new digital LED fixture onto the existing pole's tenon (see FIG. 17).

With the increase in digital resources, advance monitoring and detection systems, street lights have become a focal point for a much broader collection of purposes due in part to the fact that they are located nearly everywhere in modern cities, and have ready access to electrical power. For example, some street lights have recently been modified with small cell technology which provides localized cellular services either as a replacement for or to augment traditional large scale cellular networks. Wi-Fi routers have been used as an attachment to street lights as well.

Currently small cell technology is deployed in a variety of ways. For example, a fixture can be added to the tenon behind the existing analog light fixture (see FIG. 13). Alternatively, small cell radio equipment and antennas can be added to the pole itself as shown in various applications in FIG. 14. Finally, the entire system can be replaced with a new smart pole as shown in FIG. 15. All of these approaches have undesirable consequences and drawbacks, especially as it relates to esthetics.

The demands of this new technology create difficulties in managing the upgrade process. In some cases, existing street lights have been modified—for example to incorporate the LED lights, but increasingly the entire street light is replaced with a smart pole that combines a number of the upgrades into one new street light and pole (see FIG. 15), which is an expensive and time consuming proposition. In still other cases, the upgrades are carried out on an ad hoc basis where systems are added one at a time over a period of time. The result is difficult to manage and usually produces an unpleasant looking street light and utility pole. For example, due to the ad hoc process the integrated systems deployed on street poles often end up interfering with each other. In the end, this approach struggles to meet the needs for which it was designed.

Thus, a need exists for a street light modification process that accommodates the needs for modern technological advances but that can make use of the existing infrastructure.

The following US patent references are noted: U.S. Pat. No. 8,558,413 Light fixture having power over Ethernet power sourcing equipment; U.S. Pat. No. 9,171,455; Multimodal wireless controller for controlling an LED lighting system; U.S. Pat. No. 9,692,510 System and method for communication with a mobile device via positioning system including RF communication devices and modulated beacon light source; and U.S. Pat. No. 9,596,029 Tandem, visible light and RF communication system. The listing of any references is not an admission of relevancy or materiality of the reference, or any portion thereof.

DETAILED DESCRIPTION OF THE INVENTION

Figure 1:
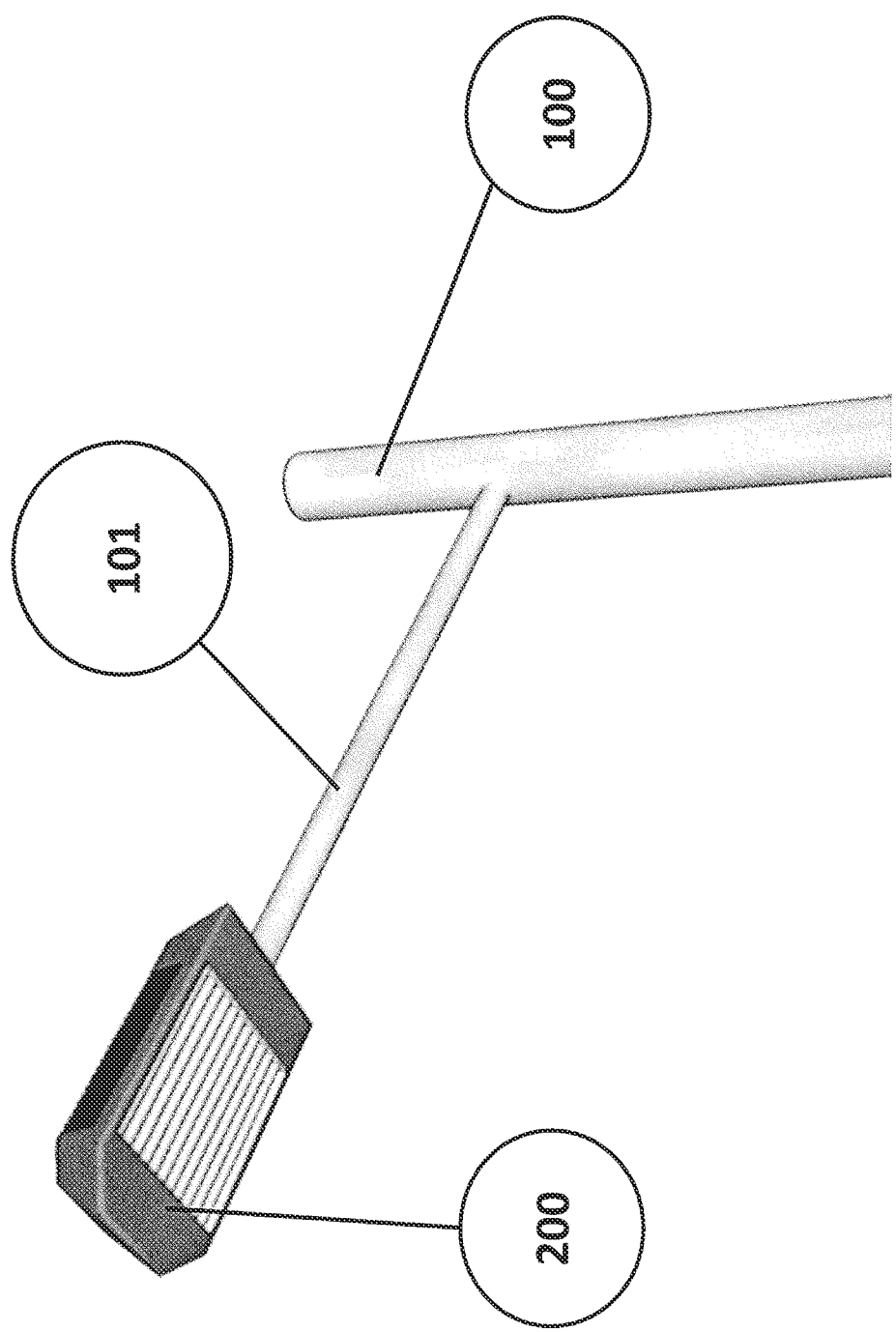
FIG. 1 is a pictorial representation of an installed light fixture on a street pole as currently deployed.

The present invention relates to a smart communications node networked and adapted for use with existing, or new, street lights. In particular, the present invention generally relates to a mobile communications network and, in particular one utilizing small cell technology mounted onto street/utility poles through which a cellular signal and/or Wi-Fi communications signals may be seamlessly maintained for voice or data exchanges, coupled with smart city computer applications utilizing the small cell technology or any other wireless or wireline connection and allowing for seamless communications to a variety of destination point (Internet access, cellular phone calls, surveillance, city monitoring center, smart vehicle guidance systems, sensors or various kinds, etc.) via a managed switch at the smart network's location.

Referring now to the drawings, the organization of the overall system will be explained.

FIG. 1 shows a prior art street light fixture 200 mounted on a tenon 101. A street or utility pole 100 supports the tenon 101, while the invention is described in reference to the foregoing street light configuration it is not necessarily limited thereto. Power is supplied to the light fixture 200 through an electrical connection embedded within the pole 100 and the tenon 101, which connects to the electrical grid through an underground power connection.

Figure 2:
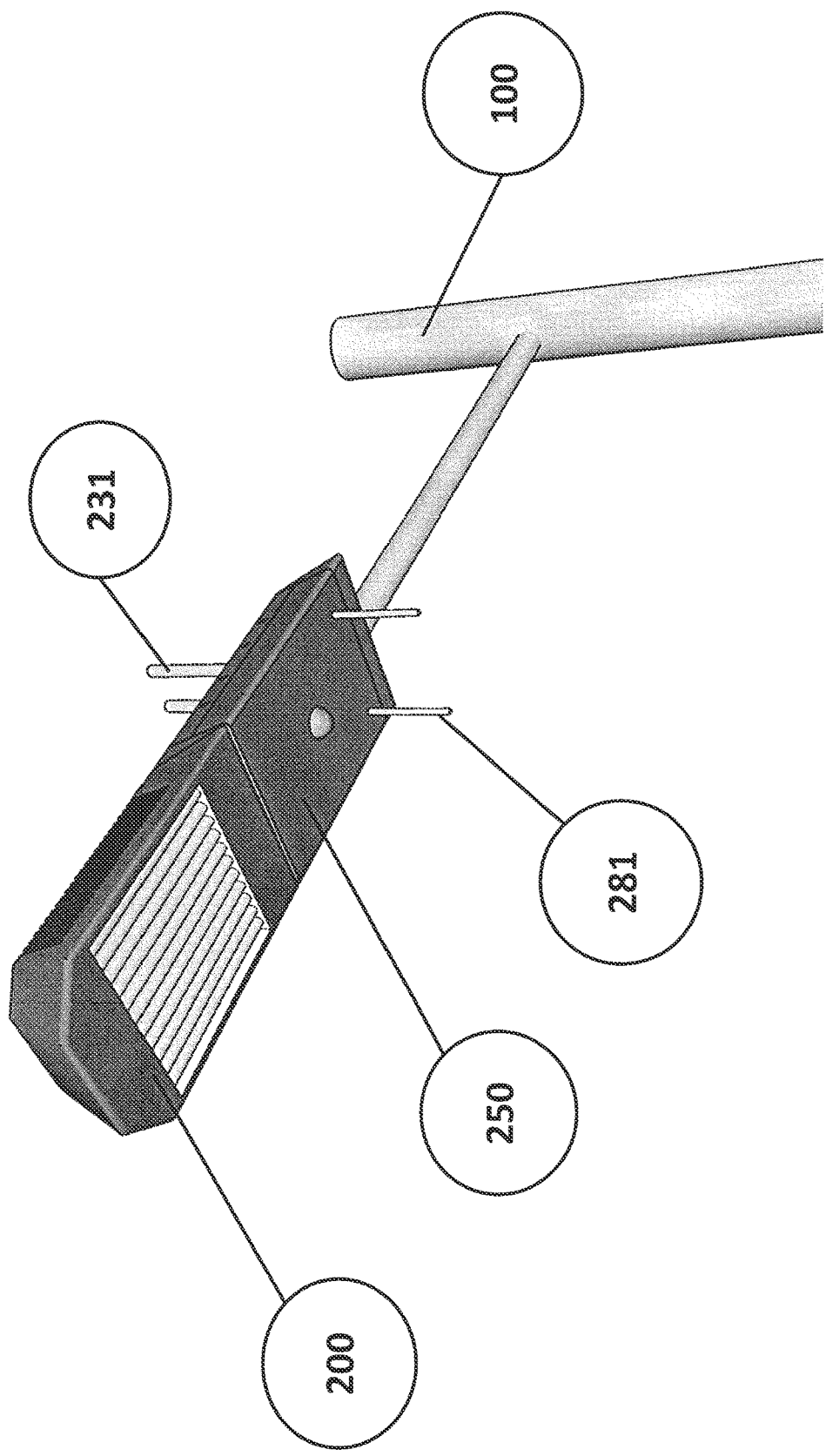
FIG. 2 is a pictorial representation of the proposed installation of the light fixture with a smart node. Such technique represents a streamlined an esthetically acceptable overall product.

FIG. 2 depicts a smart node 250 of the present invention. The node (or smart network node) 250 mounts directly behind the light fixture 200 in a streamlined and seamless manner utilizing the existing tenon 101. The node 250 includes antennas 231, 281 in a preferred embodiment method, which is described in detail below. In this manner, the present invention is particularly suited for adapting and retrofitting existing street lights, especially when done in conjunction with upgrading the light 200 to an LED or other high efficiency source.

Figure 3:
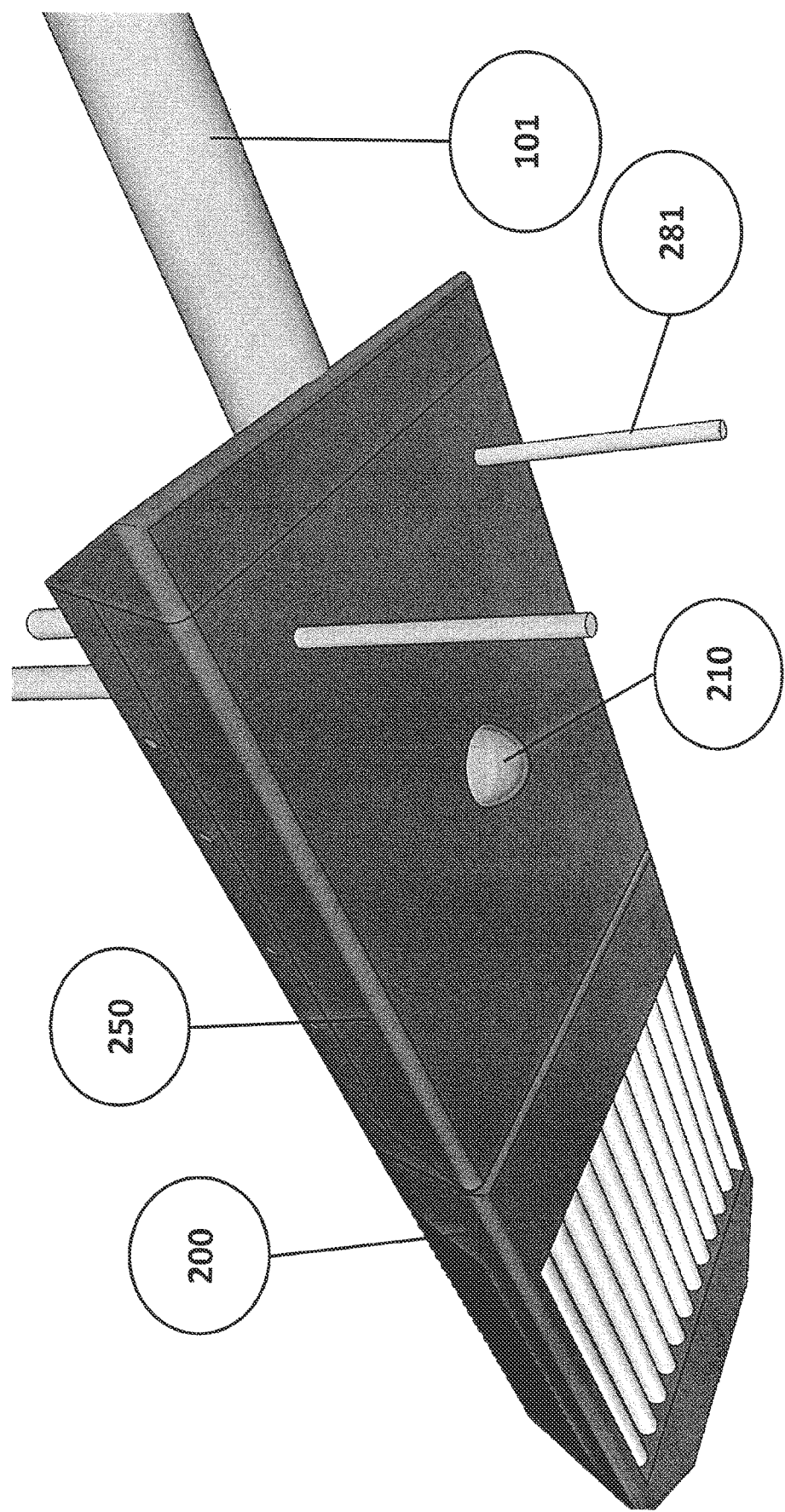
FIG. 3 is a pictorial representation of the bottom view of the modified light fixture with the smart node introducing a surveillance camera and Wi-Fi access point for area coverage.

FIG. 3 shows the smart node 250 mounted streamlined directly behind the light fixture 200 utilizing a connection to the existing tenon 101. The smart node 250 includes a pair of Wi-Fi antennas 281 mounted the underside of the node 250. A surveillance camera 210 can also be mounted on the bottom of smart node 250 to provide uninterrupted view of the area below the street/utility pole and surrounding area.

Figure 4:
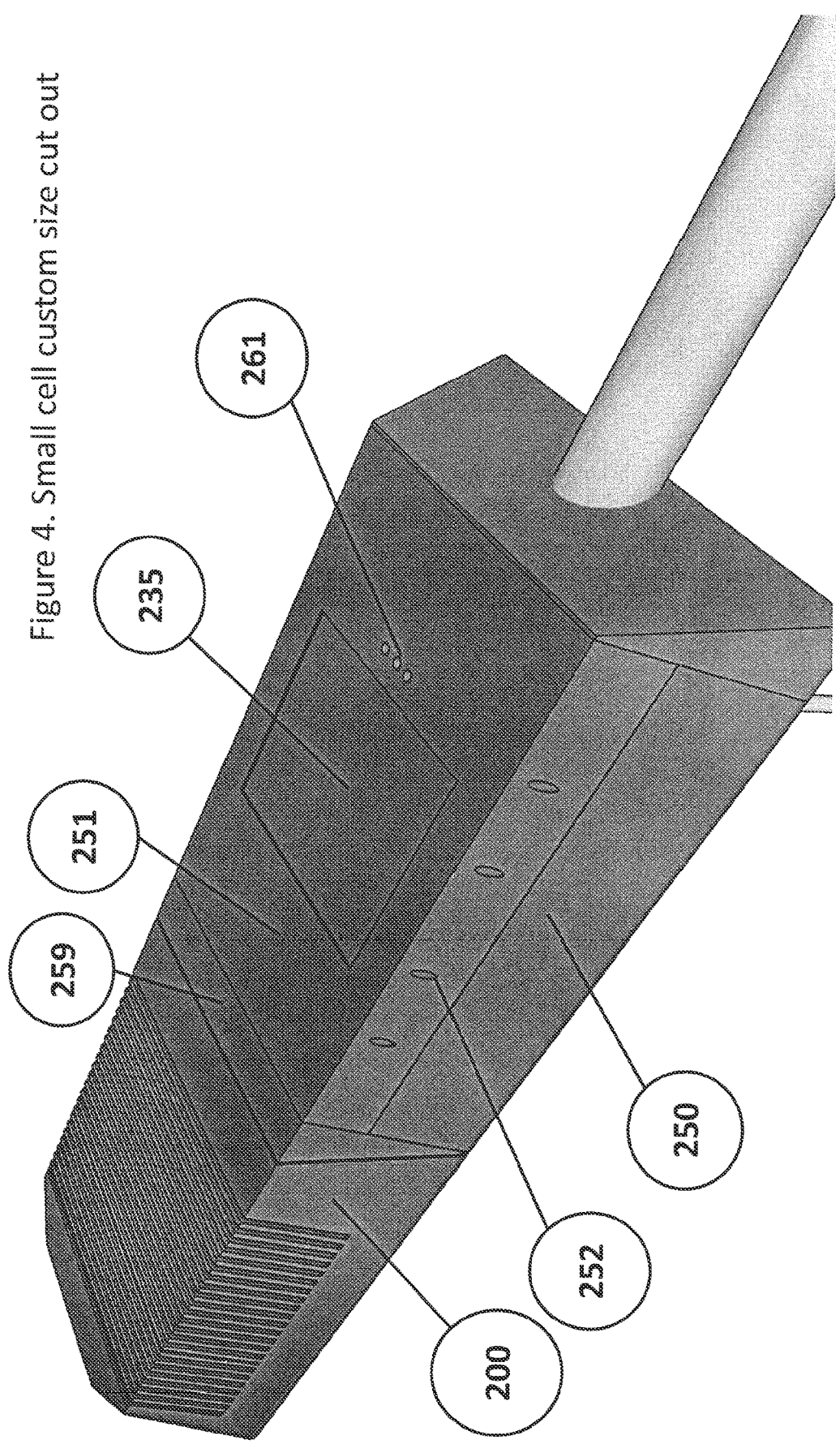
FIG. 4 is a pictorial representation of the custom cut out on the top section of the smart node enclosure and the custom per light fixture fairing to streamline the deployment.

FIG. 4 shows the smart node 250 from above, which is mounted streamlined directly behind light fixture 200. The smart node 250 contains a specific mounting cut out 235 to accommodate a specific installation of a specific brand of small cell manufacturer (the actual version of the cutout will vary depending on the size of the equipment mounted on the smart node 250). Preferably, the small cell 230 will mount to the cut out 235 located on top of the smart node 250. The smart node 250 includes a top cover 251 that can be secured in place to the remainder of the case of the smart node 250 with screws via screw holes 252. The cover 251 also contains access holes 261 used to route power and networking connections (Ethernet of Fiber optics) to the small cell 230.

FIG. 4 also depicts an adaptor fairing 259 between the node 250 and the light fixture 200. The fairing 259 may be necessary to close any gap there between, and will vary in shape and customization to adapt to each individual light brand 200 installed at the light/utility pole. The smart communication node and it elements as explained above could be included in the light fixture itself with an elongation and modification of the light fixture's mold.

Figure 5:
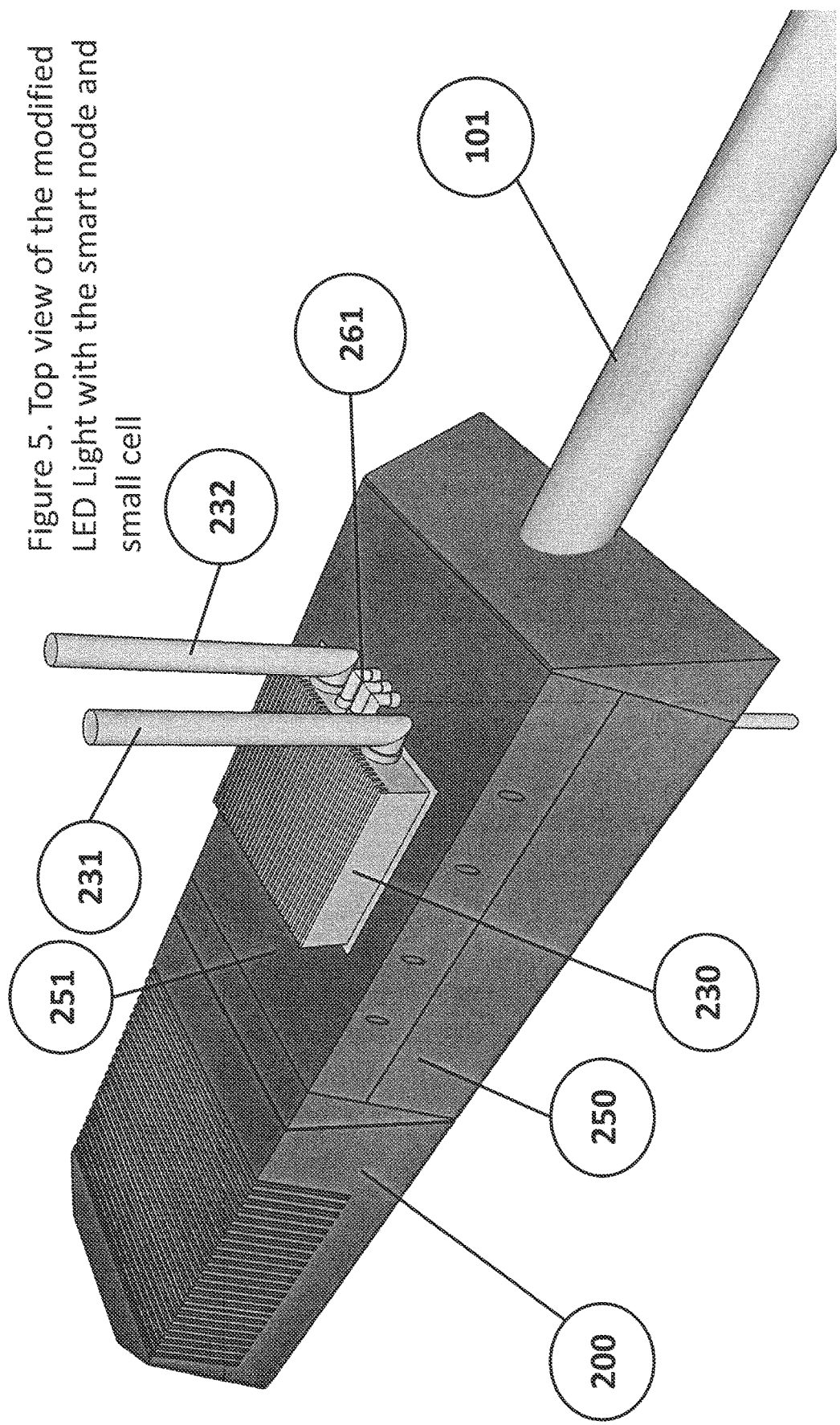
FIG. 5 is a pictorial representation of the top view of the modified light fixture retrofitted with a smart node and a small cell that is customized to the size of each small cell mounted on the top of the smart node. A specific Nokia Flexi Zone product is featured in the pictorial.

FIG. 5 depicts the top view of the smart node 250 box mounted streamlined directly behind light fixture 200 with a small cell 230 mounted on the cover 251 over the cut out 235, fully populated with radio antennas 231/232.

Figure 6:
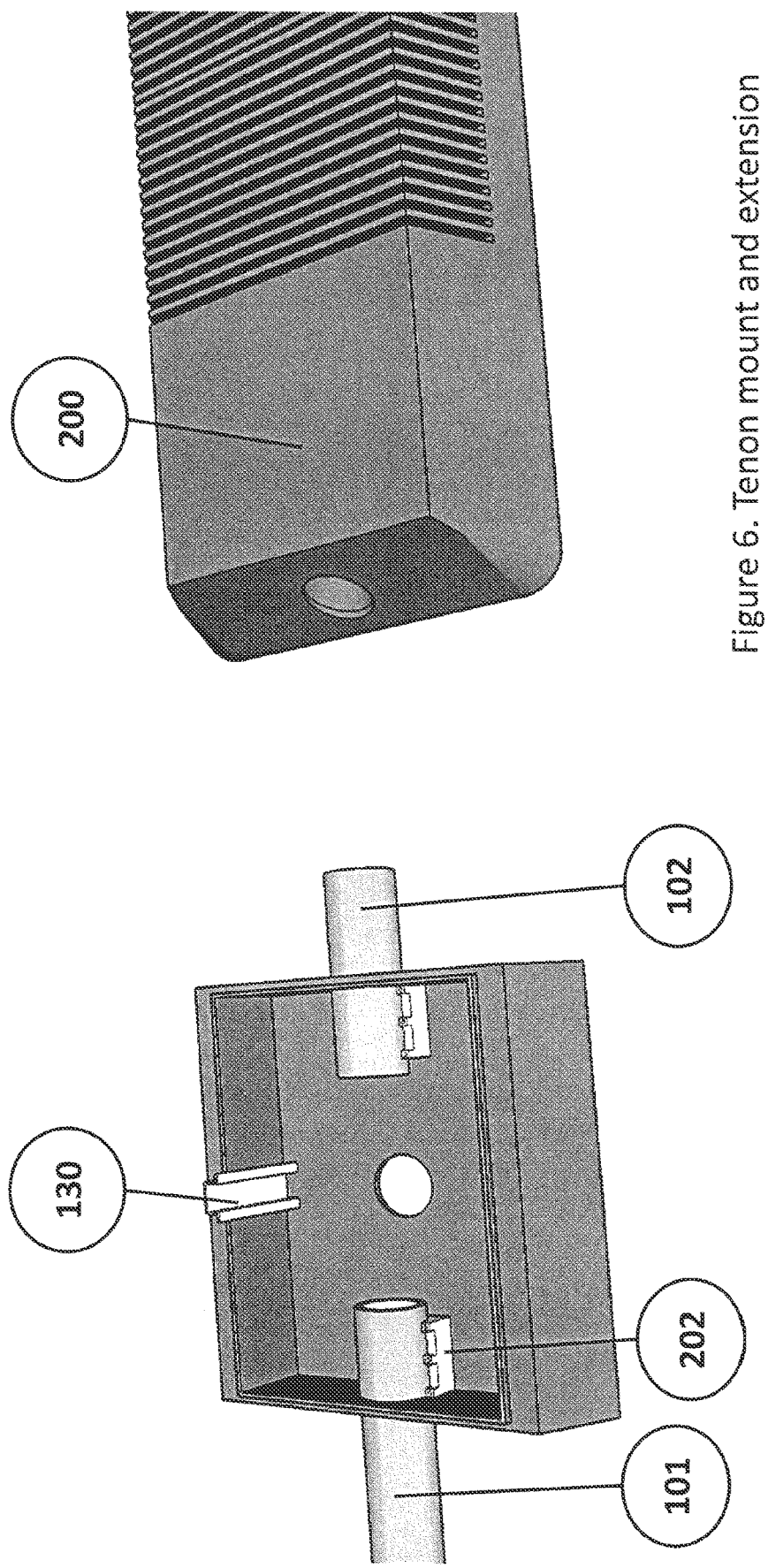
FIG. 6 is a pictorial representation of the technique used to mount the pole's tenon to the smart node and subsequently to install the light fixture.

FIG. 6 shows the node 250 with the cover 251 removed to reveal the inside of the node. FIG. 6 shows the node 250 with the internal components removed to demonstrate installation of the node 250 on the tenon 101. The tenon 101 can be cut to fit, or the existing light fixture removed to expose the end of the tenon 101 and the smart node 250 and light 200 installed there on. The exposed end of the tenon 101 fits through a hole in the node 250 and rests on a bracket 202, which is part of the apparatus that secures the node 250 to the tenon 101. An extension 102 mounts between the node 250 and the light fixture 200, and is secured in a similar manner. The length of the extension 102 and the length of the tenon 101 can be adjusted as needed to accommodate the node 250 and replacement (or existing) light fixture 200 to ensure proper placement.

Figure 7:
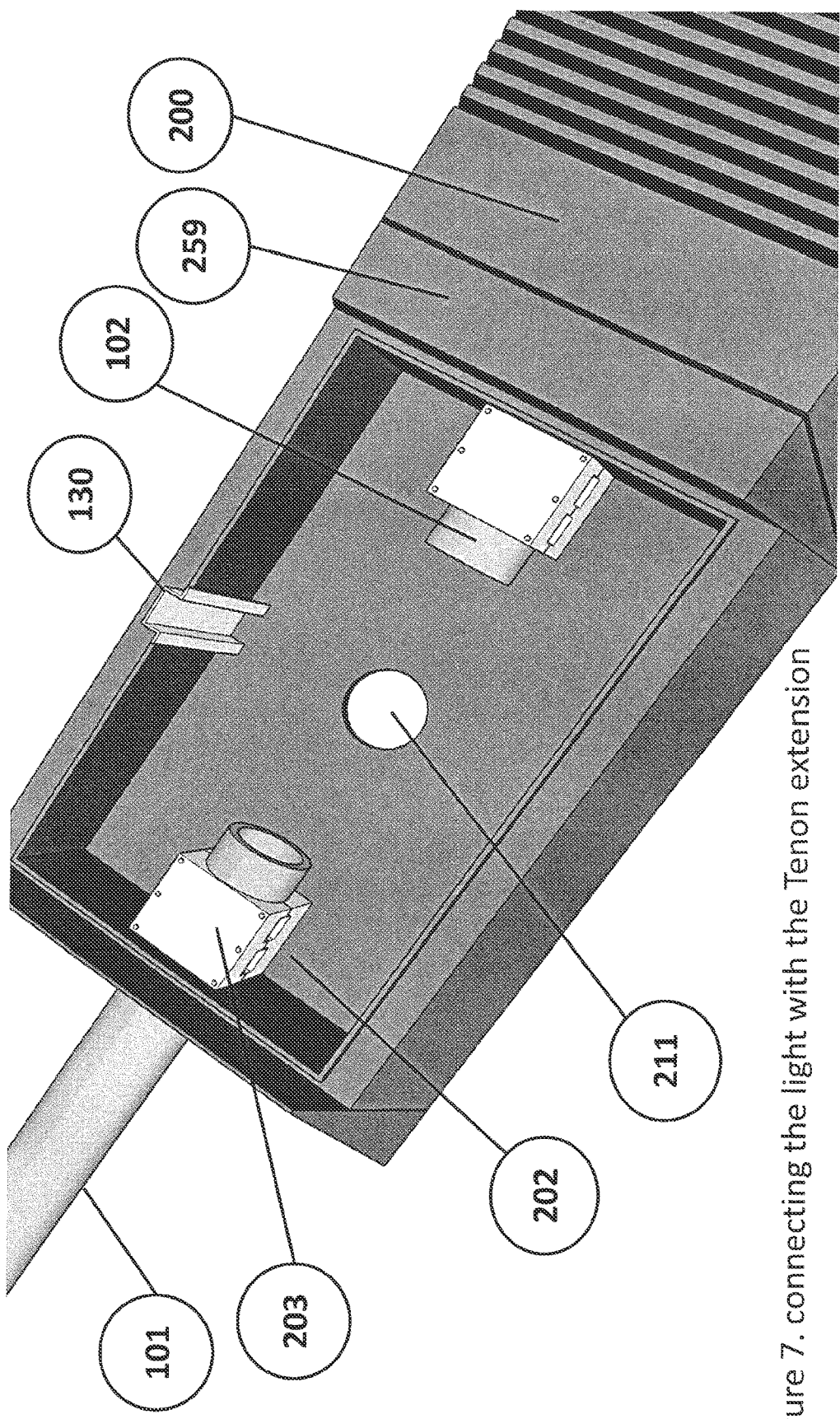
FIG. 7 is a pictorial representation of the connection technique used to secure the tenon and tenon extension. It also provides for a closer look into the customized fairing to adapt into the shape of the light fixture.

FIG. 7 shows in further detail the preferred method of locking the tenon 101 and the extension 102, where the bracket 202 and a clamp 203 are screwed together to secure the tenon 101 and extension 102. Also shown in FIG. 7 is a mounting rail 130 for mounting various networked components into the smart node 250. Still further, FIG. 7 shows a cutout hole 211 in the bottom of the node 250 for the surveillance camera mounting. In the preferred method, shown in FIG. 7, the adaptor fairing 259 mounts between the smart node 250 and the light fixture 200.

Figure 8:
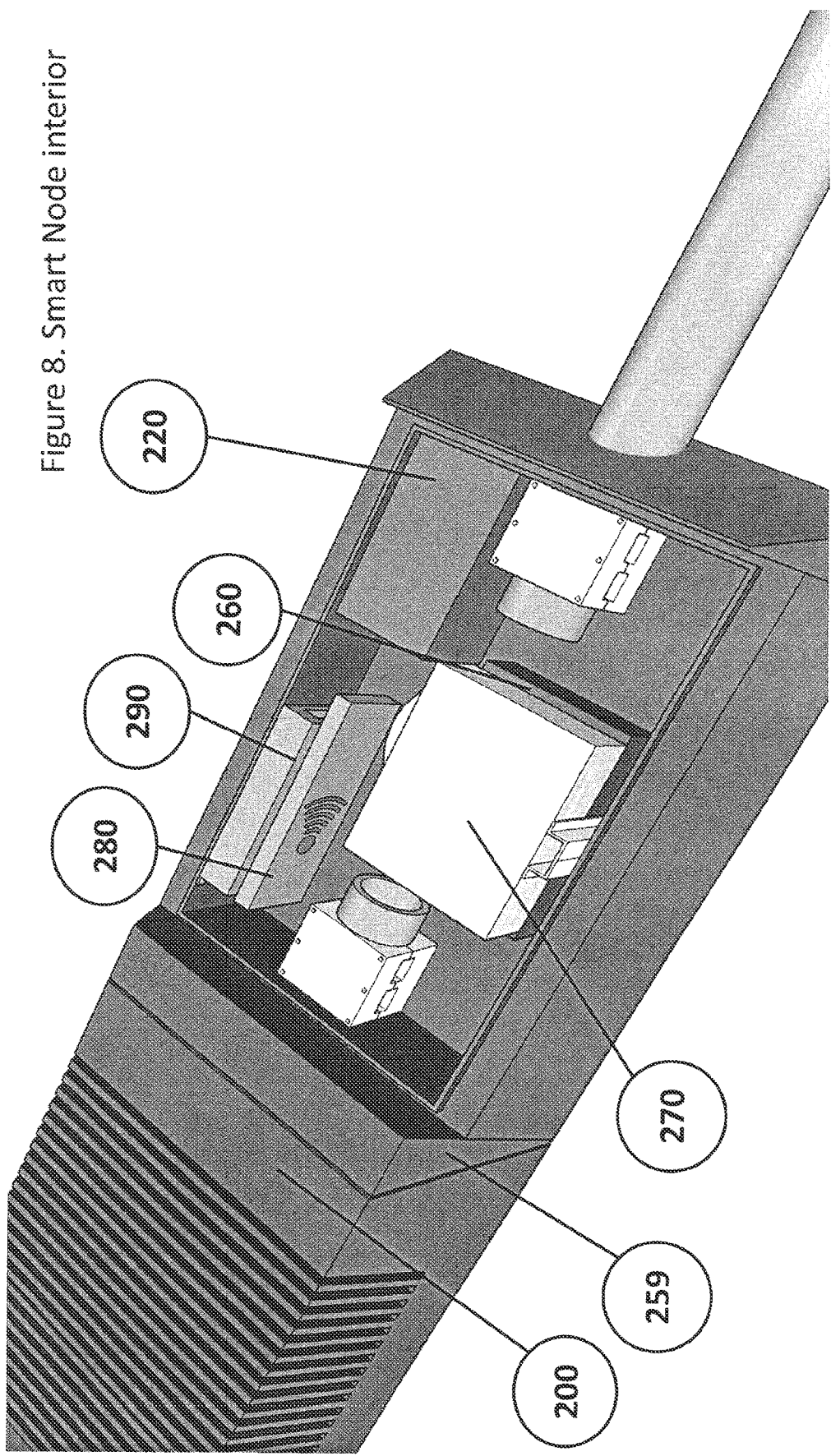
FIG. 8 is a pictorial representation of the smart node's interior view with all networked components mounted into the enclosure.

FIG. 8 shows the individual components to be mounted inside the smart node 250 such as power supply 270, smart city sensors 290, power distribution box 220, and other components such as Wi-Fi access point 280, and power over Ethernet switch 260 (which allows network cables to also carry electricity thereby reducing the amount of cable/cords needed). It is understood that additional antennas for the smart sensors could be deployed.

Figure 9:
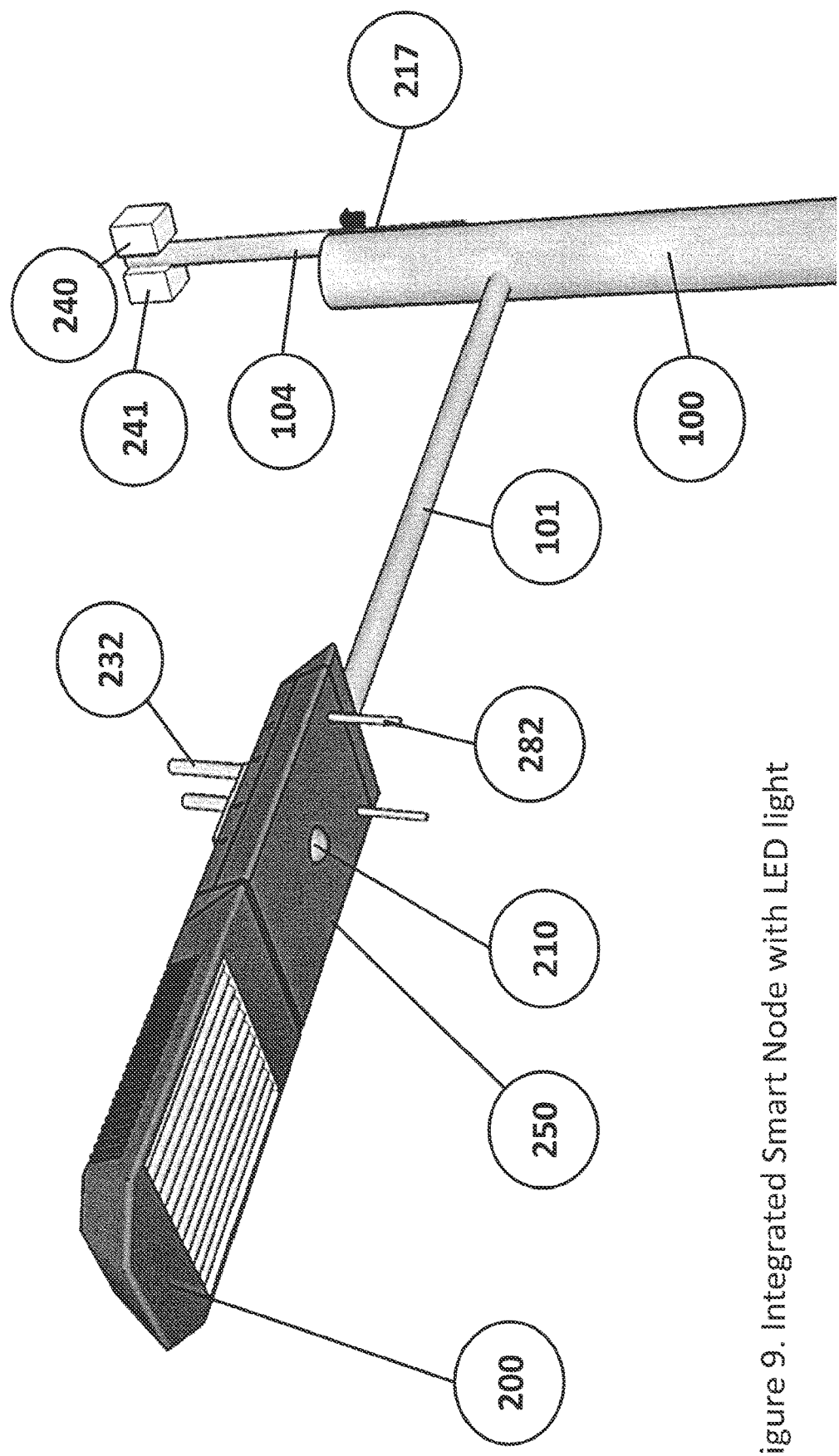
FIG. 9 is a pictorial representation of the fully integrated smart node with the light fixture. It shows the streamlined light and smart node powers through the main tenon and external networking facilities for wireless connection in the event a fiber connection is not available. A GPS antenna is provided as well.

FIG. 9 depicts the smart node 250 mounted streamlined directly behind the light fixture 200 utilizing the existing tenon 101 with the Wi-Fi antennas 282 mounted below the smart node 250. A surveillance camera 210 is also mounted on the bottom of the smart node 250. FIG. 9 also demonstrates another configuration utilizing a point to point microwave unit 241/242 as the means to deliver signals from point A to point B, which can efficiently transmit signals to and from the street light to a microwave antenna (however, the foregoing embodiment is typically limited to line of site communication). The configuration also includes a GPS antenna 217 connected to the small cell 230.

Figure 10:
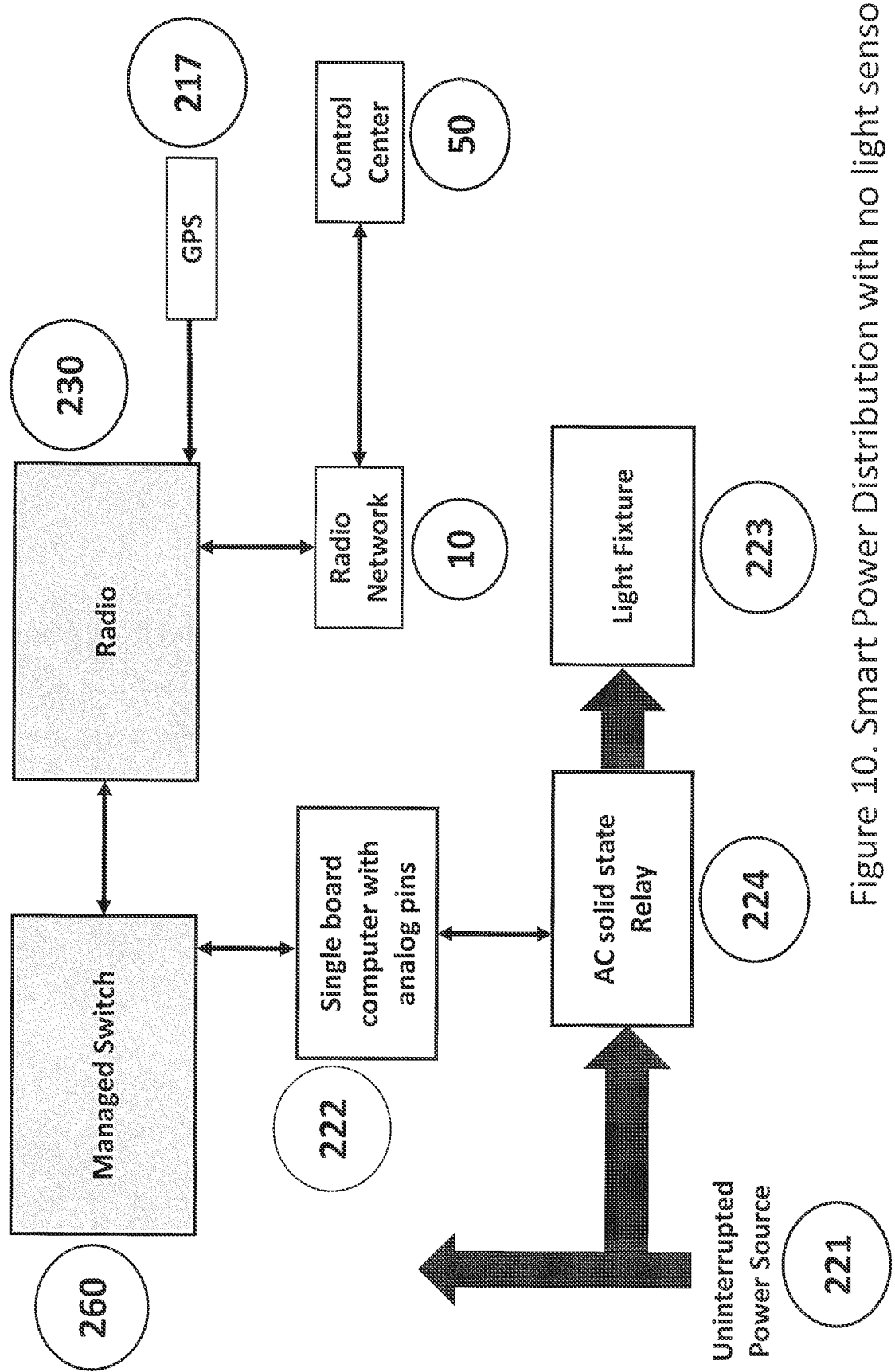
FIG. 10 is a drawing of the preferred power distribution system showing light fixture power activation/regulation controlled via GPS and managed via the smart node and its associated components powered 24/7.

FIG. 10 is a block diagram of the power distribution system used to power the smart node 250 and the light fixture 200. The smart node 250 requires constant power from an uninterrupted power source 221 while the light fixture needs to be regulated according to the pre-programmed activation program when all other street lights turn on/off allowing for light illumination only certain hours of the day. A single computer programmable device 222 is used to regulate the voltage. An AC solid state relay 234 communicates with the electronics 223 of the light fixture 200. Activation time for the light fixture 200 can be programmed remotely via the wireless network 10 from a remote control center 50. The system also includes a radio 230 attached to the small cell 232 that works with the radio network 10, and a GPS system 217 which communicates positioning information. A managed/network switch 260 is in communication with the radio 230 and computer 232, and is described in more detail below. In the system shown in FIG. 10 does not include a light sensor for turning the light fixture 200 on and off, however, it is contemplated that one can be used with the invention.

Figure 11:
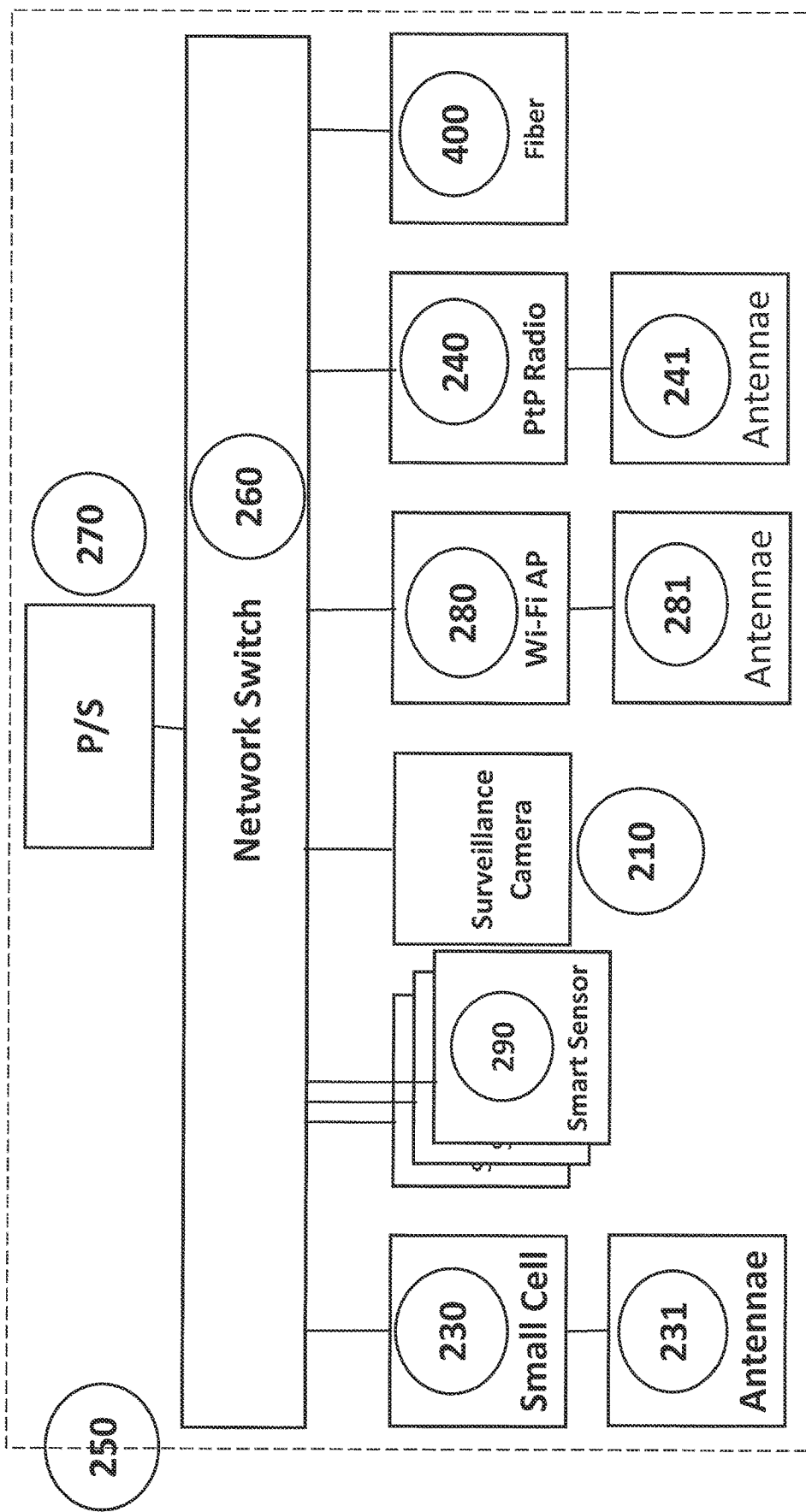
FIG. 11 is a drawing of the smart node's block diagram connecting various elements of the smart node to a programmable switch that directs traffic to the appropriate center for processing.

FIG. 11 represents a block diagram of a plurality of the networked devices in the smart node 250. The network switch 260 is programmed with instructions to route the appropriate data to each designated point via fiber optics of the point to point microwave radio connections. These devices include the small cell 230, a variety of smart sensors 290 (discussed below), surveillance camera 210, Wi-Fi application 280, point to point radio 240, and fiber optics 400. Various antennas are connected to some of the devices as shown in FIG. 11. Additional devices can be used with the invention as well.

Figure 12:
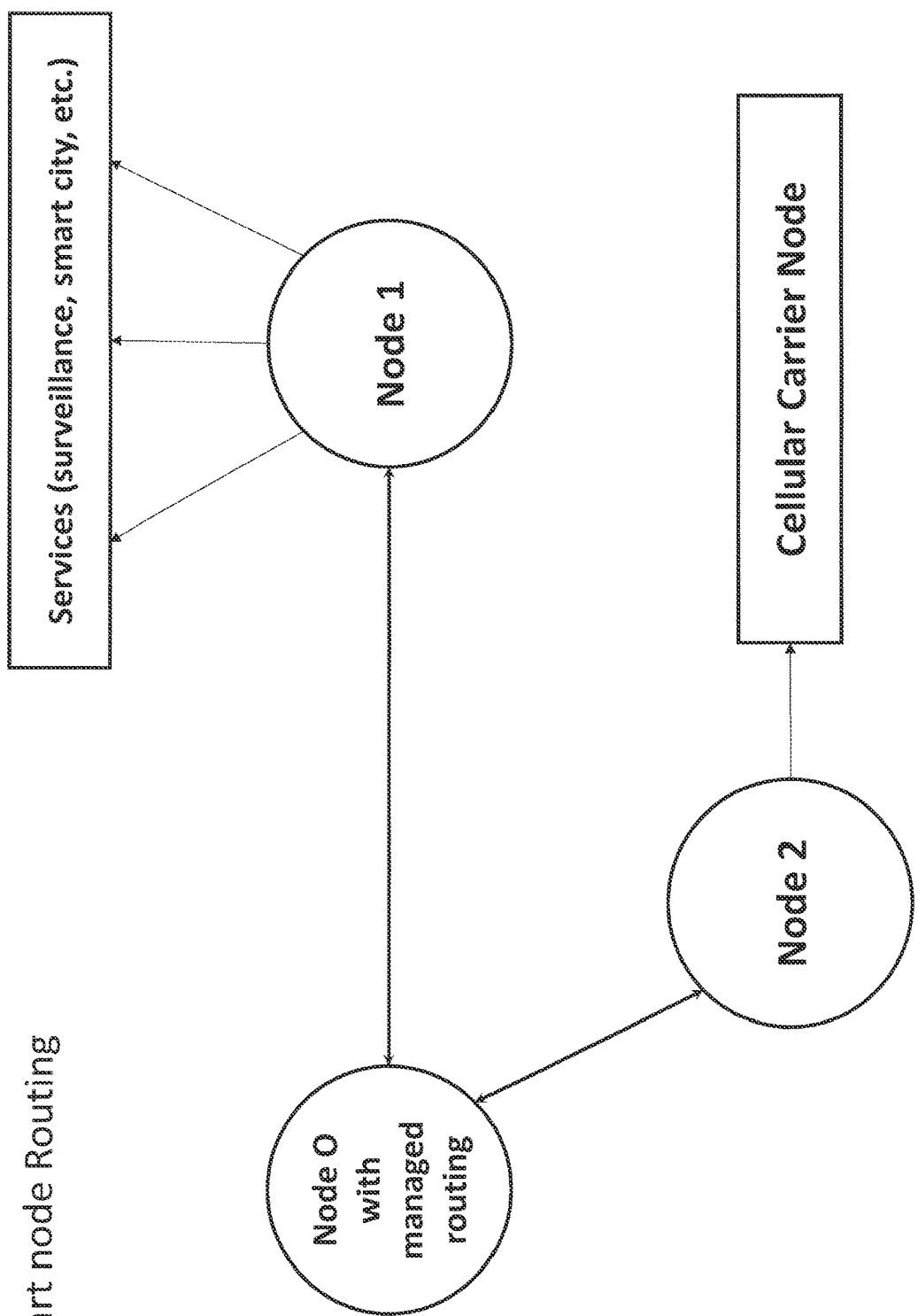
FIG. 12 is a diagram of a potential routing method of the smart node based on the application source and application dependency. It shows a destination based dependent routing, in this particular example, a cellular network application.

FIG. 12 provides for a network routing based on the destination point. For, example cellular network traffic will flow thru node 2, but surveillance information will be routed via node 1. For those trained in the art it is obvious that certain code exists at the managed switch (node 0) to route traffic at the appropriate application. Additional nodes can be added as needed by the various components of the system. In another implementation of such smart node system one could route all smart node data to a singular network node residing at the cloud or a specific Network Center for further analysis and distribution to its sources.

Figure 13:
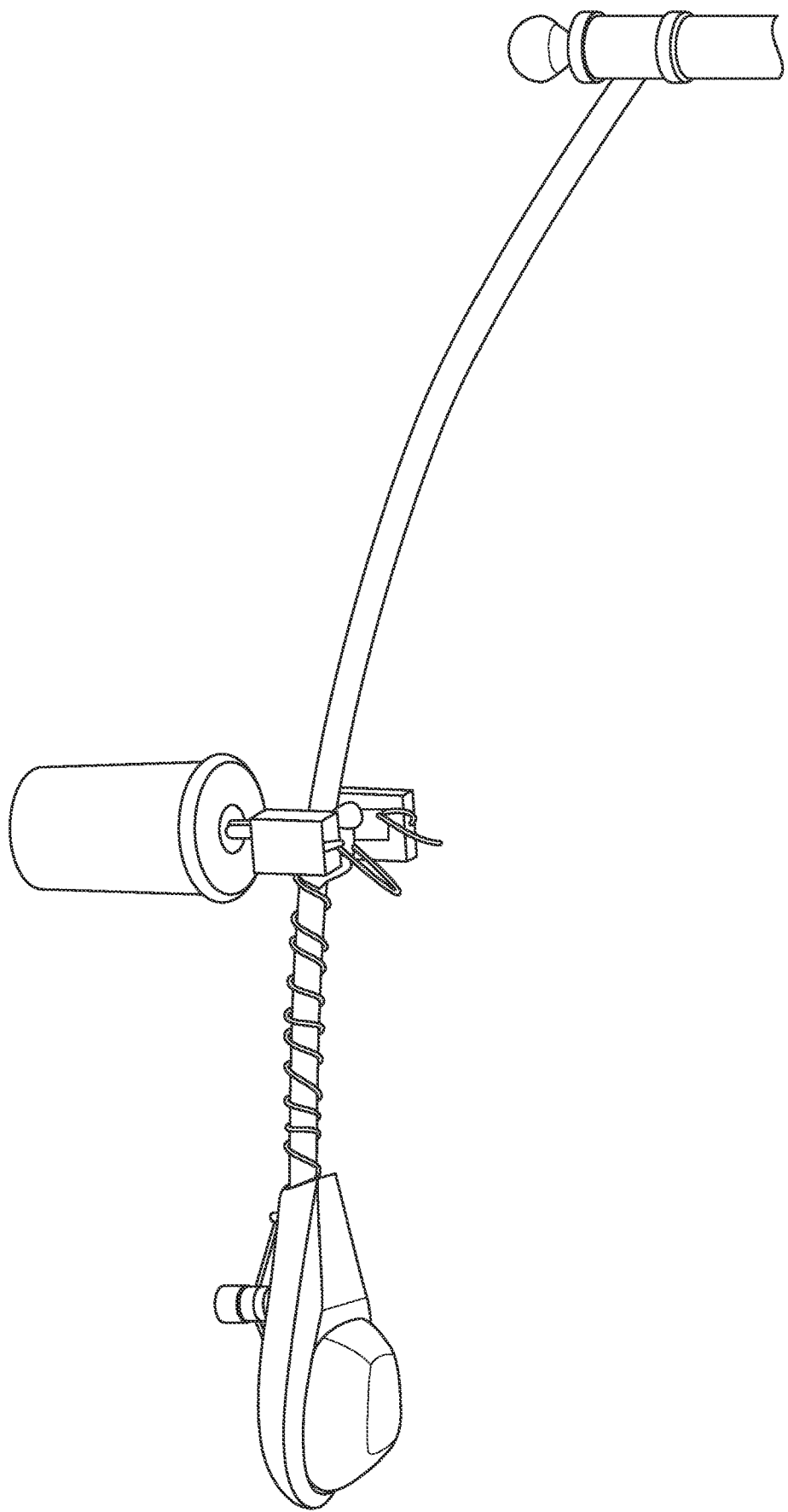
FIG. 13 is a pictorial view of a Street light fixture or utility pole small cell deployment showing techniques currently used in the deployment of small cells.

FIG. 13 shows a prior art installation method of a street light or utility pole with a small cell mounted on a tenon. Such deployment offers for no specific integration with other smart networked nodes (Wi-Fi, sensors, cameras, etc.) and suffers from a number of other drawbacks as described herein.

Figure 14:
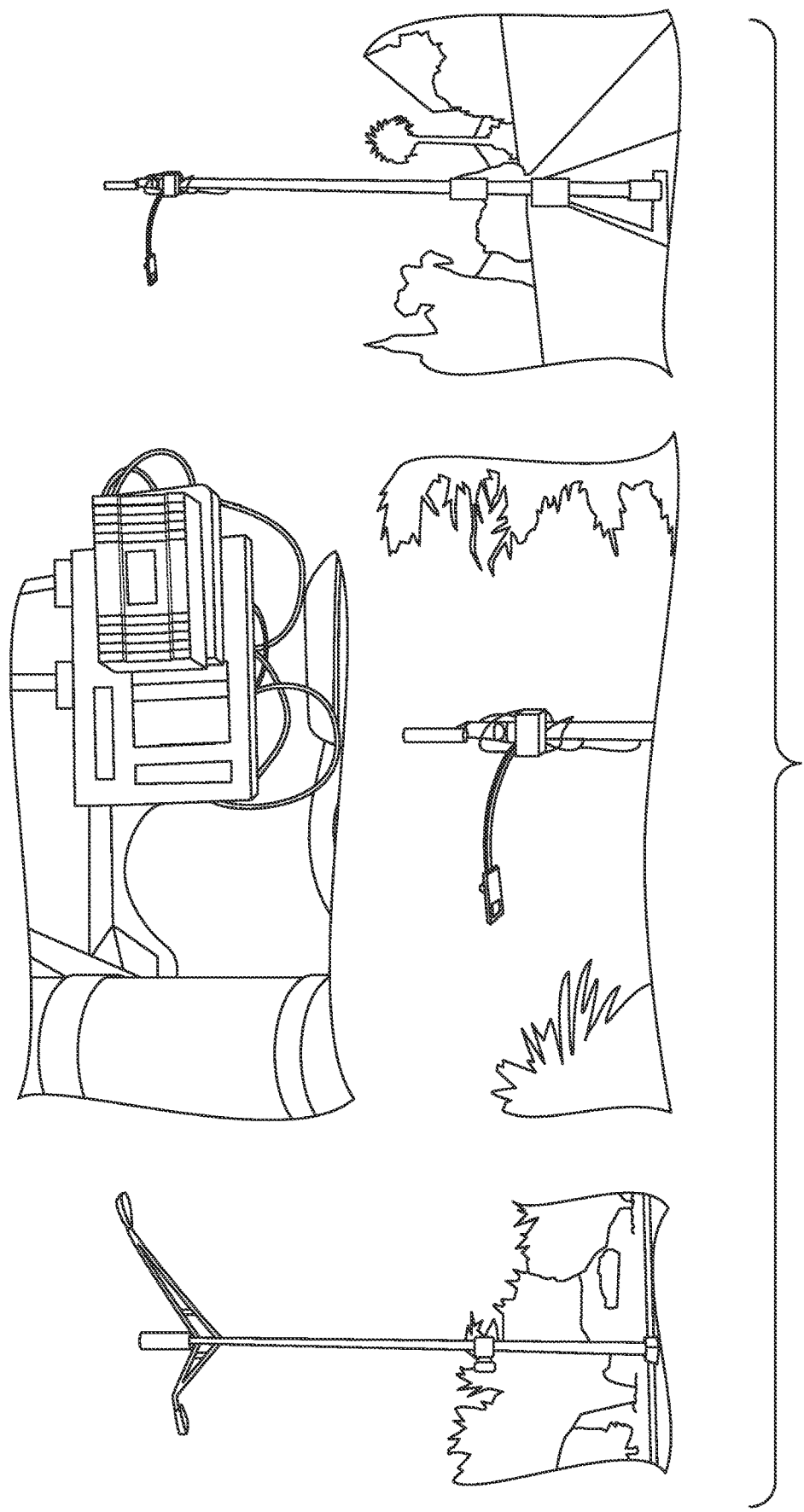
FIG. 14 is a pictorial view of a small cell deployment on a Street light or utility pole.

FIG. 14 demonstrates additional prior art methods of installing small cells on street lights or utility poles. It demonstrates that current techniques offer no streamlined integration into a single box and mostly relies on ad hoc modifications to the existing poles.

Figure 15:
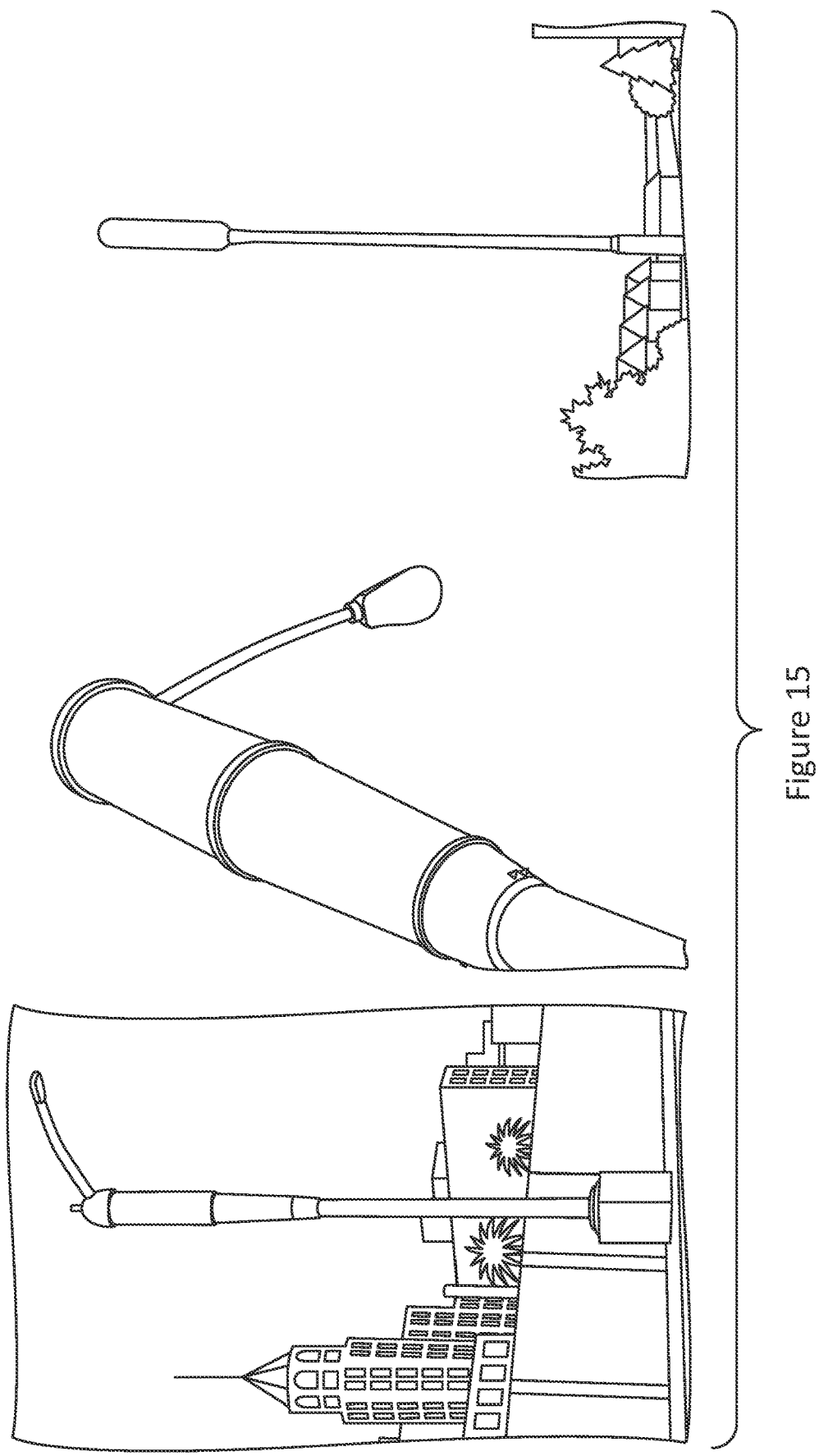
FIG. 15 is a pictorial view of a modified Street light or utility pole small cell deployments.

FIG. 15 shows a prior art installation method utilizing brand new poles on street lights or utility poles to accommodate various type of integration with other systems, but which requires an entirely new pole and most likely removal of the old poles.

Figure 16:
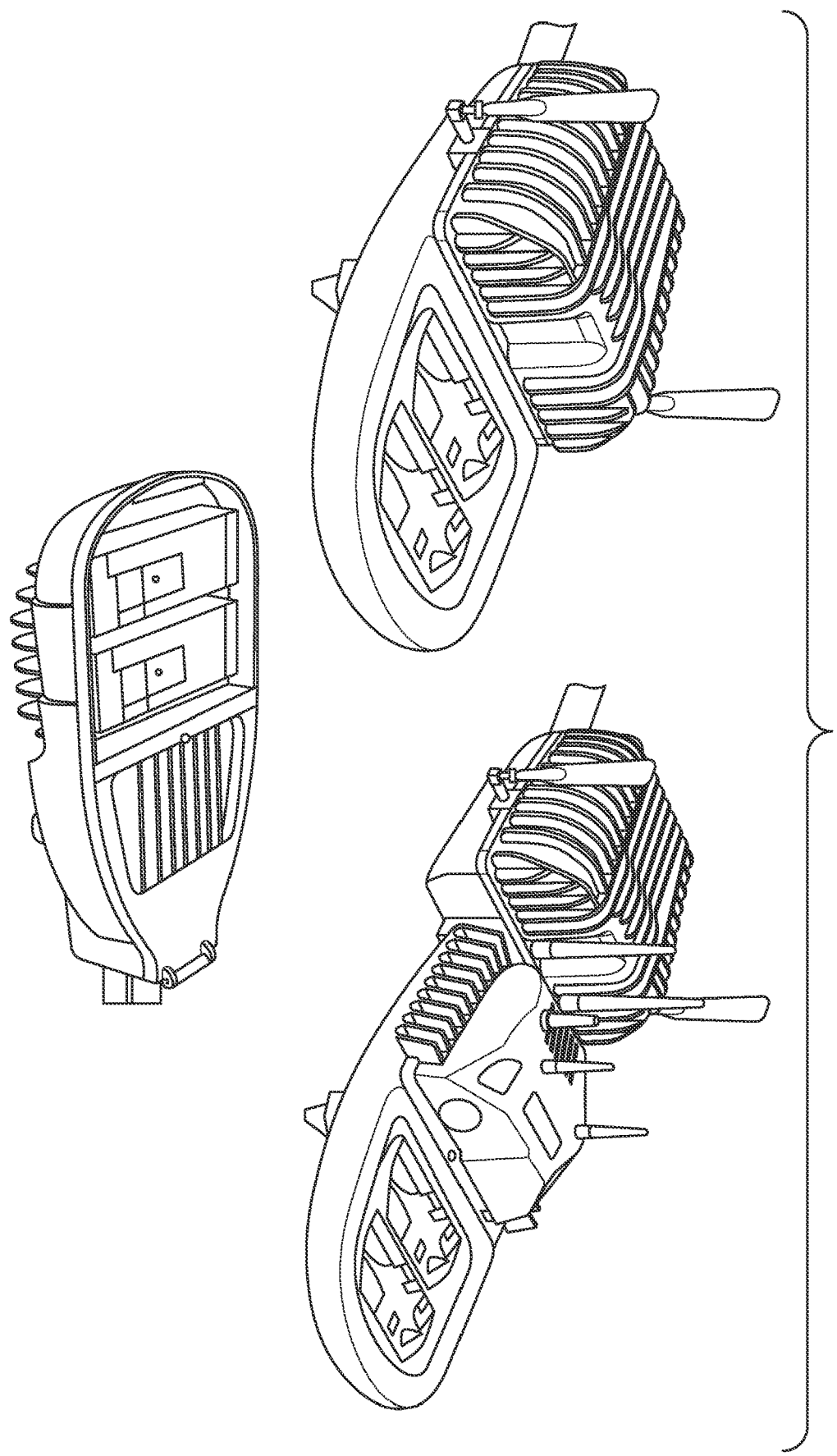
FIG. 16 is a conceptual pictorial representation of a small cell and Wi-Fi installation on a GE brand light fixture.

FIG. 16 depicts a specific prior art concept of a small cell with a Wi-Fi access point on a light pole. It should be noted that the small cell and Wi-Fi configuration antennas are pointed the same direction and antenna separation will present a huge interference management problem. It should be noted that this installation (as well as the other prior art installations) would require new UL and FCC certifications, which is not the case with the present invention.

Figure 17:
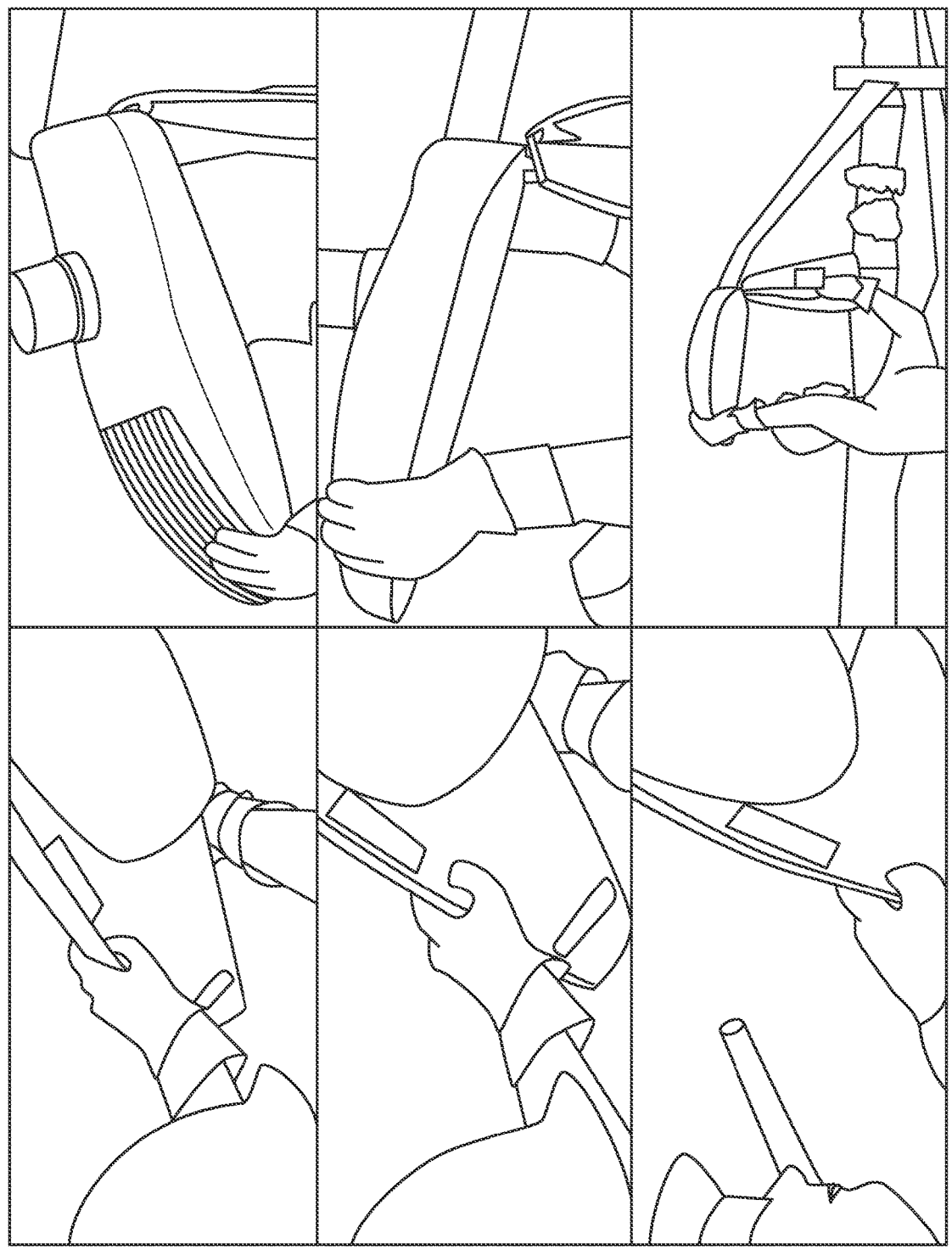
FIG. 17 is a pictorial representation of one of the techniques used to replace an old light fixture with a new light fixture.

FIG. 17 demonstrates the methodology used to remove an old light and replace with a new light.

While the present invention has been described in reference to a street light, the invention is not necessarily so limited and can be applied to other similar devices such as light poles, lampposts, street lamps, light standards, or lamp standards. In reference to the smart sensors the smart node of the present invention can include a variety of different sensors that can monitor one or more of the following, parking, vibration, noise (such as gunshots), traffic, accumulation of waste/rubbish, air quality, fire detection, snow level, power outages, emergency calls (911), gas detection, radiation detection, perimeter access of controlled persons, weather conditions, and the like.

Various non-limiting embodiments of the present disclosure are described above to provide an overall understanding of the principles of the structure, function, and use of the systems, apparatuses, devices, and methods disclosed. One or more examples of these non-limiting embodiments are illustrated in the selected examples disclosed and described in detail with reference made to FIGS. 1-17 in the accompanying drawings. Those of ordinary skill in the art will understand that the systems, apparatuses, devices, and methods specifically described herein and illustrated in the accompanying drawings are non-limiting embodiments. The features illustrated or described in connection with one non-limiting embodiment may be combined with the features of other nonlimiting embodiments. Such modifications and variations are intended to be included within the scope of the present disclosure.

The systems, apparatuses, devices, and methods disclosed herein are described in detail by way of examples and with reference to the Figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific Figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

It should be noted, that although for clarity and to aid in understanding, some examples discussed herein might describe specific features or functions as part of a specific component or module, or as occurring at a specific layer of a computing device (for example, a hardware layer, operating system layer, or application layer), and those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems, and can use other protocols, or operate at other layers in communication protocol stacks than the one's described.

The invention claimed is:

1. A street light, comprising:
a pole for support;
a main tenon section connected to the pole;
an extension tenon section spaced from the main tenon section;
a light fixture connected to the extension tenon section;
the main tenon section and the extension tenon section are disposed in a smart node for housing one or more electrical components, where the extension tenon section mounts between the smart node and the light fixture, where the smart node is connected to the light fixture by the extension tenon section and the smart node is connected to the pole by the main tenon section.

2. The street light of claim 1 where the smart node further comprises an enclosure having a removable cover.

3. The street light of claim 1 where the smart node further comprises at least two clamps, where a first clamp secures to the extension tenon section and a second clamp secures to the main tenon section.

4. The street light of claim 1 where the one or more electrical components comprises a small cell unit.

5. The street light of claim 1 where the one or more electrical components comprises one or more smart sensor that can monitor one or more of the following parameters: parking, vibration, noise, traffic, accumulation of waste/rubbish, air quality, fire detection, snow level, power outages, emergency calls (911), gas detection, radiation detection, perimeter access of controlled persons, or weather conditions.

6. The street light of claim 1 where the one or more electrical components comprises a camera.

7. The street light of claim 1 where the one or more electrical components comprises a regulated voltage power supply separate from a power source powering a lamp of the street light.

8. The street light of claim 1 where the one or more electrical components comprises a Wi-Fi access point.

9. The street light of claim 1 where the one or more electrical components comprises a radio transmitter and receiver.

10. The street light of claim 1 where the one or more electrical components comprises a microwave signal transmitter and receiver.

11. The street light of claim 1 where the one or more electrical components comprises a GPS unit.

12. The street light of claim 1 where the one or more electrical components comprises a programmable computing device.

13. The street light of claim 1 where the one or more electrical components comprises a fiber optics network.

14. The street light of claim 1 where the one or more electrical components comprises an Ethernet network.

15. The street light of claim 1 where the one or more electrical components comprises a means for directing digital data traffic into a cellular network originating from a small cell for the exchange of voice and data via a managed switch.

16. The street light of claim 1 further comprising a fairing located between the smart node and the light fixture for covering a gap therebetween.

17. The street light of claim 1 where the length of the main tenon section and the extension tenon section is adjusted to ensure proper placement of the light fixture.

18. The street light of claim 3 where the clamps further comprise a clamp and a bracket that are screwed together such that one clamp secures the main tenon section and the other clamp secures the extension tenon section.

19. The street light of claim 6 where the camera is mounted in a hole in the smart node.

20. The street light of claim 18 where the clamps are located inside the smart node.

* * * * *